United States Patent
Honda et al.

[15] 3,683,047
[45] Aug. 8, 1972

[54] PRODUCTION OF BLOCK COPOLYMERS

[72] Inventors: Makoto Honda, 19-3, 2-chome, Sakura-zutsumi, Musashino-shi, Tokyo; Kenichiro Sato, 19-3, 2-chome, Shimura, Itabushi-ku, Tokyo, both of Japan

[22] Filed: Nov. 20, 1969

[21] Appl. No.: 878,309

Related U.S. Application Data

[63] Continuation-in-part of Ser. No. 643,864, June 6, 1967, abandoned.

[30] Foreign Application Priority Data

June 22, 1966 Japan ......................41/40044

[52] U.S. Cl. ........260/857 TW, 260/78 R, 260/857 G
[51] Int. Cl. ..............................................C08g 41/04
[58] Field of Search............260/857, 857 TW, 857 G

[56] References Cited

UNITED STATES PATENTS

| | | |
|---|---|---|
| 2,130,948 | 9/1938 | Carothers...................260/78 |
| 2,193,529 | 3/1940 | Coffman.....................260/857 |
| 2,852,485 | 9/1958 | Stottt..........................260/857 |
| 3,160,677 | 12/1964 | Duxbury....................260/857 |
| 3,195,603 | 7/1965 | Ahles.........................260/857 |
| 3,393,252 | 7/1968 | Zimmerman..............260/857 |
| 3,432,575 | 3/1969 | Zimmerman..............260/857 |

FOREIGN PATENTS OR APPLICATIONS

| | | |
|---|---|---|
| 828,264 | 2/1960 | Great Britain.............260/857 |
| 979,103 | 1/1965 | Great Britain.............260/857 |

OTHER PUBLICATIONS

Frunze, Korshak, et al., High Molecular Weight Compounds (U.S.S.R.) 1, 500– 505 (1959) No. 4, Apr.

*Primary Examiner*—Paul Lieberman
*Attorney*—Stevens, Davis, Miller and Mosher

[57] ABSTRACT

A process for producing new type block-copolymers by polycondensation at a temperature below 250°C. of at least two different prepolymers selected from the group consisting of the four prepolyamides represented by the following general formulas:

i. $H_2N\text{-}(A)\text{-}NH_2$
ii. $H_2N\text{-}(B)\text{-}NH_2$
iii. $HOOC\text{-}(A)\text{-}COOH$
iv. $HOOC\text{-}(B)\text{-}COOH$, wherein A and B are different and represent polyamides having a molecular weight of from 1,000 to 4,000.

6 Claims, 7 Drawing Figures

INVENTORS
MAKOTO HONDA,
KENICHIRO SATO

BY Stevens, Davis, Miller & Mosher
ATTORNEYS

PRODUCTION OF BLOCK COPOLYMERS

This application is a continuation-in-part of Ser. No. 643,864 filed June 6, 1967 now abandoned, for "A Process for Producing Block Copolymer."

Recently, in the synthetic high polymer field, the preparation of block copolymers consisting of two different polymers has been of considerable interest for the purpose of obtaining polymer having new properties, but heretofore there has been no satisfactory method for producing block copolymers based upon polyamides. Thus, when two polyamides of different components are heated together at temperatures above their melting points, the mixture is gradually converted into a copolyamide with random sequences of chain components. The formation of random copolyamides is explained by the amide-interchange reaction between the different polyamide chain molecules. Recently, several attempts to prepare block copolyamides by a controlled amide-interchange reaction between two different polyamides have been reported. (J. Appl. Chem. 4, 444 (1954); J. Polymer Sci., 8, 395.) Melt blending of two polymers results in the formation of an intimately mixed physical mixture with no chemical bonding between polymer chains, not considering of course, hydrogen bonding between carbonyl and amino hydrogens. Limited amide interchange does result in the formation of a very small amount of "interchange block copolymer." One of the possible explanations is that as each polyamide is composed of repeating amide linkages, i.e.,

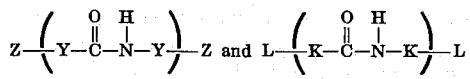

it is possible to interchange large segments, that is, segments containing many monomeric repeating units between large polymeric chains, for instance,

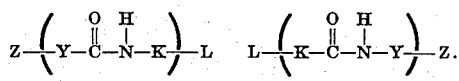

It is apparent that the molecular weight of the amide exchanged copolymer cannot be successfully controlled since the

permits such exchange to be located at any position within the respective chains.

In general then, when two polyamides of different components are heated together at temperatures above their melting points, the mixture is gradually converted into a copolymer with random sequences of chain components. This formation of random copolyamides follows from the amide-interchange reaction between the different polyamide chain molecules, as explained above.

However, applicants have discovered that when amino-terminated polyamides are block copolymerized with carboxylic-terminated polyamides under a certain temperature, such amide-interchange reaction is minimal while the reaction of amino-terminated groups with carboxylic-terminated groups occurs almost completely.

It is an object of the present invention to provide a method for preparing new type block copolymer which comprises polycondensing two kinds of polyamide in the desired ratio. This and other objects will be readily apparent from the following description and accompanying drawings. In these latter:

Figure 6:
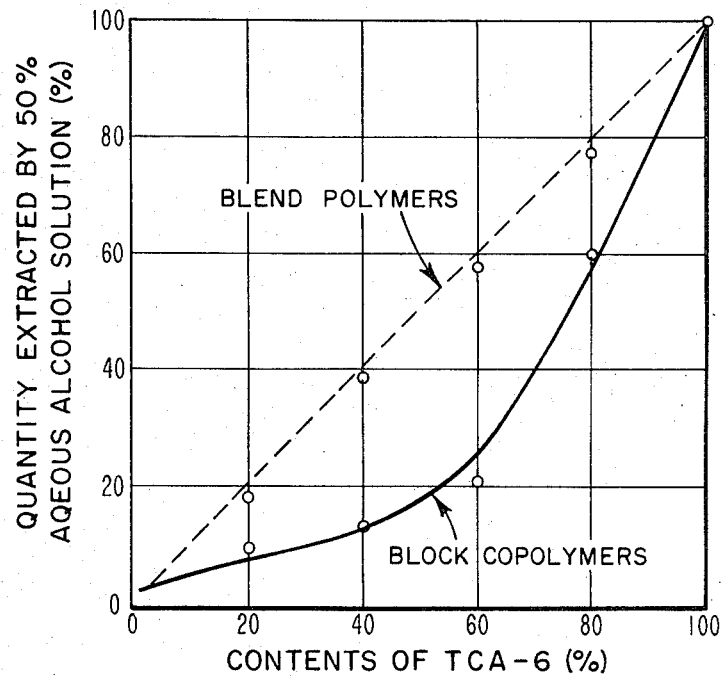
Figure 7:
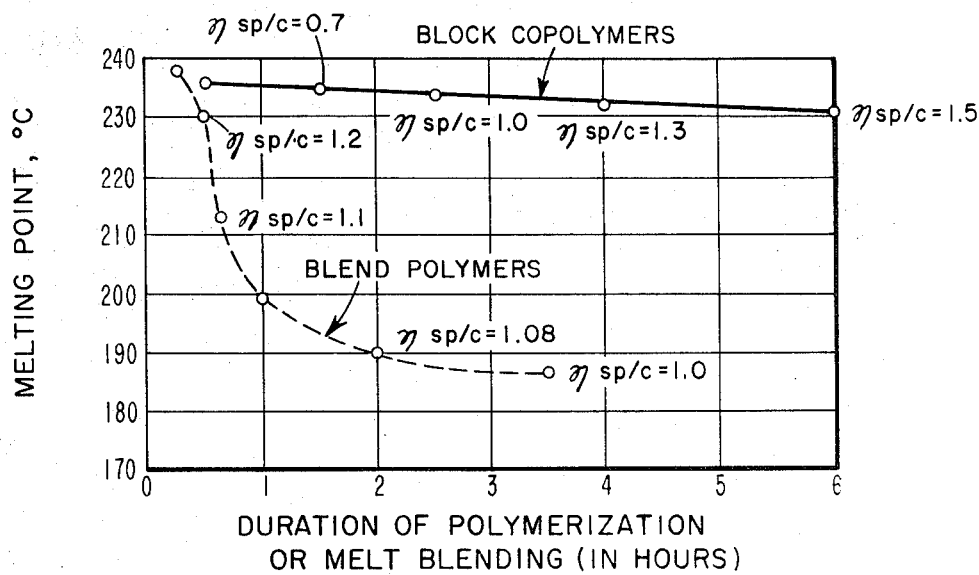

FIG. 6 shows the results of extraction experiments of block copolymers prepared by the method in example 1 and blend compositions of polymer prepared from 1-2-bis-(amino methyl) cyclobutane and adipic acid and polymer prepared from hexamethylenediamine and adipic acid (blend condition; 275°C. 5 min.); and FIG. 7 shows the relation between the duration of polymerization or melt blending and the melting point of block copolymer (TCA–6: 6,6 = 60:40) and the melting point of blend composition (TCA-6:6,6 = 60:40, blend temperature: 275°C).

In FIG. 6 and FIG. 7, the solid line represents the block copolymers and the dotted line the blend polymers.

This invention, accordingly, is characterized by polycondensing a amino-terminated polyamide prepolymer with a carboxylic-terminated polyamide prepolymer. Such amino- or carboxylic-terminated polyamide prepolymers have a molecular weight of from about 1,000 to 4,000. In this invention, two different kinds of polyamide are block copolymerized, the two prepolymers exist in a total of four forms since each of the two prepolymers can be either amino-terminated or carboxylic-terminated. The amino- and carboxylic-terminated forms of the same polyamide prepolymer unit can be prepared from the same nylon salt.

It has been usually necessary to change the molecular weight of the prepolymers in order to change the ratio of the chain components in the copolymer, but it has been difficult to keep the amino- or carboxylic-terminated groups stable in the case of high molecular weight prepolymers above a certain degree. The inventors have now developed a procedure whereby the ratio of two different polyamides units in such block copolymers can be varied over the entire range without changing the molecular weights of the prepolymers readily and effectively by polycondensing at a relatively low temperature and in the desired ratio at least two different prepolymers selected from the group consisting of four comparatively low-molecular weight prepolyamides represented by the following general formulas:

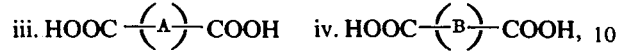

wherein A and B are different and represent polyamides having a molecular weight of from 1,000 to 4,000.

It is generally known that when two different kinds of nylon salts are mixed in various ratios and copolymerized by the conventional method, the curve showing the relation between the melting point and composition of the resulting random copolymer is V-shaped, having at opposite ends the melting point of the respective pure components, except the case of isomorphous replacement.

On the other hand, a block copolymer prepared from two different polyamides, A and B, according to the present invention has a characteristic relation between the melting point and composition, i.e., the melting point of the block copolymer product falls substantially along a line directly connecting the melting points of component polyamides, A and B.

Figure 1:
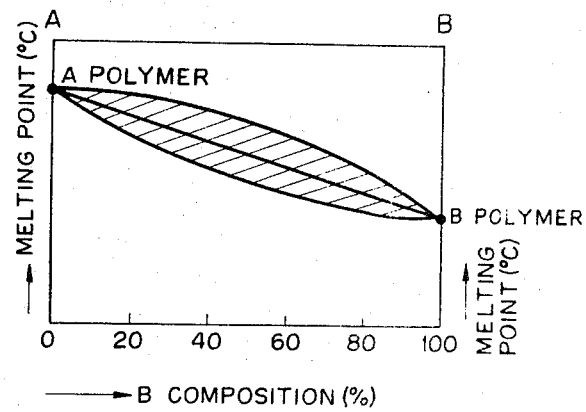
FIG. 1 is a model chart, showing the relation between the composition and melting point in block copolymers.

Stated another way, said line may be expressed by the following equation:

$$mBP = mA - (mA - mB)B/100$$

wherein mBP = melting point of block copolymer mA = melting point of higher melting homo-polymer A mB = melting point of lower melting homo-polymer B B = proportion of polymer B as percentage of block copolymer ABP While, theoretically at least, the melting points of the block copolymers ABP composed of prepolymers A and B should fall along a straight line A–B as in FIG. 1, in actual practice there are some minor deviations from the theoretical, but substantially all will fall within the shaded areas above and below this line A–B as indicated in FIG. 1.

The block copolymers synthesized according to the present invention have a higher melting point and show better mechanical properties as compared with the copolymers produced by conventional methods, because the block segments in these polymers consist of the sequences of several repeating units and their individual crystallinity is maintained. Since the polymers prepared by the method of this invention are block copolymers, they demonstrate the unique and characteristic properties of each of the component polymers. The properties of block copolymers vary with the molecular weight and the composition of the original unit polymers, i.e., the prepolymers. Both the molecular weight and the composition of block copolymers can be selected to suit the purpose for which it is to be used. The thus-obtained block copolymers are quite different from blend polymers produced by the conventional blend method and are particularly useful as raw materials for the production of fibers or shaped articles. In this invention, in order to develop the characteristics of block copolymers, the molecular weights of the prepolymers must be in the order of about 1,000 to about 4,000.

The nature and practice of the invention are set forth more fully in the following description and accompanying examples.

A prepolymer having amino-terminated groups is produced by adding an excess diamine to nylon salt or ω-amino acid and effecting a polycondensation reaction, and similarly a prepolymer having carboxylic-terminated groups is obtained by adding excess amount of dicarboxylic acid to the salt or the acid. In the case of preparing a prepolymer having amino- or carboxylic-terminated group from ω-amino acid, diamine or dicarboxylic acids having the same number of carbon atoms as ω-amino acid, or amines or carboxylic acid having the same number of carbon atoms as the other polymer to be block copolymerized are generally used. However, the number of carbon atoms in the several compounds need not be identical so long as the differences are not such as to impair the properties of the copolymer to be produced.

Thus, two prepolyamides, one an amino-terminated and the other a carboxylic-terminated polyamide, are prepared from the same nylon salt. Therefore, four prepolyamides are synthesized from two different nylon salts. These four prepolymers are mixed in any desired ratio, but the moles of amino- and carboxylic-terminated groups must be substantially equivalent. It is possible to mix the prepolymers in the molten state, but preferably they are mixed well in powder form in a suitable mixer, since prepolymers having a molecular weight of from about 1,000 to about 4,000 are readily pulverized. In order to obtain a block copolymer with the desired polymerization degree, it is highly important that the reaction temperature and time in the polymerization be closely controlled because when the mixture is heated to a high temperature for a long time, it will convert to random copolymer. It is therefore necessary to avoid copolymerization until the desired polymerization degree is attained. When the reaction temperature is below about 250°C., copolymerization accompanying the amide interchange reaction will not proceed to a significant extent even when heating is over 2 hours.

There are two general methods for the preparation of block copolymer, that is, (a) by amide-exchanging reaction of different kinds of polyamides, and (b) by polycondensation reaction of amino-terminated polyamide with carboxy-terminated polyamide. Applicants have determined that the amide-exchanging reaction between different kinds of polyamides takes place at comparatively high temperatures exceeding 250°C. and proceeds progressively with time. It is, accordingly, very difficult to define essential conditions for completion of the amide-exchanging reaction.

On the other hand, the polycondensation reaction of an amino-terminated polyamide with a carboxy-terminated polyamide according to the present invention takes place continuously at the temperature range below 250°C. at which temperature there is substantially little amino-exchanging reaction. Moreover, the viscosity of the block polymer so prepared can be controlled by regulating the amounts of the prepolymers.

The relation of melting point and polymerization time of block copolymer obtained according to the method of this invention is shown in FIG. 7 which also shows the relation of melting point and melt blending time for blend copolymer obtained according to the method of the amide-exchanging reaction using the same two polymers, that is, TCA–6 (viscosity ($\zeta sp/c$) = 1.3) and 6,6 (viscosity ($\zeta sp/c$) = 1.5).

From these experimental results, it is readily apparent that the method of this invention is markedly superior to the amide-exchanging reaction.

In this invention, when one of the two prepolymers employed has a much higher melting point than the other, the mixed prepolymers are heated in a short time up to the melting point of the prepolymer having the higher melting point and then the block copolymerization is carried out by reducing the temperature. In the reaction of this invention it is desirable to block copolymerize the prepolymers in a short time, removing the generated water from the reaction mixture as quickly as possible.

In this invention, any thype of polyamide may be used as a prepolymer, for example, polyamide derived from ω-amino acid such as polycaproamide(nylon 6), polyheptamide(nylon 7), polynonamide(nylon 9), polyundecamide(nylon 11), paraaminomethylbenzoic acid, etc. and polyamide, consisting of diamine and dicarboxylic acid, such as poly(hexamethylene adipamide) (nylon 6,6), poly(hexamethylene sebacamide) (nylon 6,10), poly(hexamethylene dodecamide) (nylon 6,12), poly-(hexamethylene-5-oxa-undecamide), poly(paraxylene-5-oxa-undecamide), poly(1,2-cyclobutane dimethylene adipamide), etc.

Reaction products obtained by the above-described procedure are in the molten state as in the case of an ordinary polyamide.

A more detailed description of the invention is given in the following examples. However, it should be understood that these examples are presented only by way of illustration and that the invention is not in any manner limited thereby.

EXAMPLE 1

A series of block polyamides was synthesized from two kinds of prepolymer, one consisting of 1,2-bis-(amino methyl)cyclobutane and adipic acid (TCA–6) and the other consisting of hexamethylenediamine and adipic acid (6,6). And relation between the melting point and composition ratio of the block copolymer were studied.

First, TCA–6 prepolymer having amino-terminated group was synthesized from 140 parts of TCA–6 nylon salt and 11.4 parts of 1,2-bis-O-amino methyl) cyclobutane. Its molecular weight was 1,500. Another TCA–6 prepolymer having carboxylic-terminated group (M.W. 1,910) was made from 165 parts of TCA–6 nylon salt and 14.6 parts of adipic acid.

Next, two kinds of prepolymers were made, one having amino-terminated group (M.W. 1595) and consisting of 138 parts of 6,6 nylon salt and 11,6 parts of hexamethylene diamine, and the other having carboxyl-terminated group (M.W. 1,880) and consisting of 169 parts of 6,6 nylon salt and 14,6 parts of adipic acid.

Four kinds of prepolymers made by the above-mentioned procedures were mixed in the powder state in the ratios set out in table 1 and melted at 270°C. for 10 minutes under a current of nitrogen, and reacted at 245°C. for 1 hour under reduced pressure of 1 mmHg, whereby block polyamides, having the melting points as shown in the following table 1 were synthesized. The block copolymers produced were crystalline at all composition ratios.

TABLE 1

Block polyamides and Composition Variance

| Terminated group | M.W. | TCA–6 Contents (%) | | | | | | | |
|---|---|---|---|---|---|---|---|---|---|
| | | 0 | 20 | 40 | 50 | 60 | 80 | 90 | 100 |
| TCA–6 amino | 1500 | 0 | 0 | 0 | 0 | 1.1 | 5.0 | 6.9 | 15 |
| TCA–6 acid | 1910 | 0 | 4.75 | 9.5 | 19.1 | 10.9 | 11.0 | 11.0 | 1.91 |
| 6,6 amino | 1595 | 16 | 13.6 | 10.9 | 16 | 8.0 | 4.0 | 2.0 | 0 |
| 6,6 acid | 1880 | 18.8 | 5.4 | 3.4 | 0 | 0 | 0 | 0 | 0 |
| Block copolymer m.p. (°C) | | 264 | 254 | 241 | 236 | 233 | 222 | 214 | 211 |
| Block copolymer reduced viscosity* | | 1.2 | 1.18 | 1.04 | 1.3 | 1.4 | 1.2 | 1.5 | 1.3 |

* measured at 25°C. using 0.5% metacresol solution.

Figure 2:
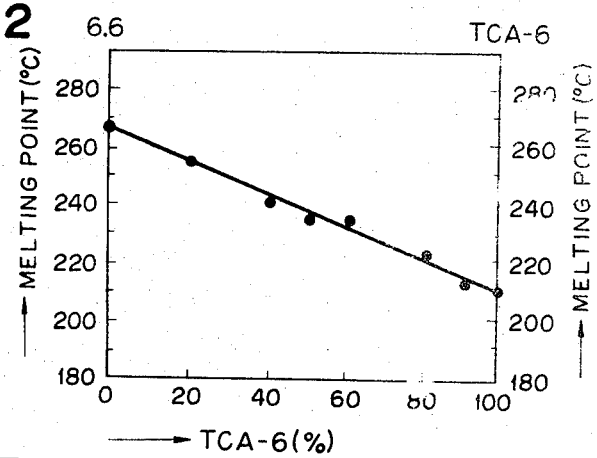
FIG. 2 is a chart showing the relation between the composition and melting point for block copolymers consisting of poly(1,2-cyclobutane dimethylene adipamide) and poly(hexamethylene adipamide) (nylon 6,6)

The melting points are plotted against the prepolymer composition in FIG. 2 falling substantially along the straight line connecting the melting points, respectively, of the prepolymers.

COMPARATIVE EXAMPLE 1

TCA–6 nylon salt and 6,6 nylon salt were well mixed in the ratio described in the above table 1, and first prepolymerized at 270°C. for 2 hours in a closed system substituted by nitrogen gas, secondly heated in a molten state at 270°C. for 30 minutes in an open system under a current of nitrogen gas and thirdly heated at 270°C. for 1 hour under a reduced pressure of 1 mmHg. to produce random copolymer.

Figure 3:
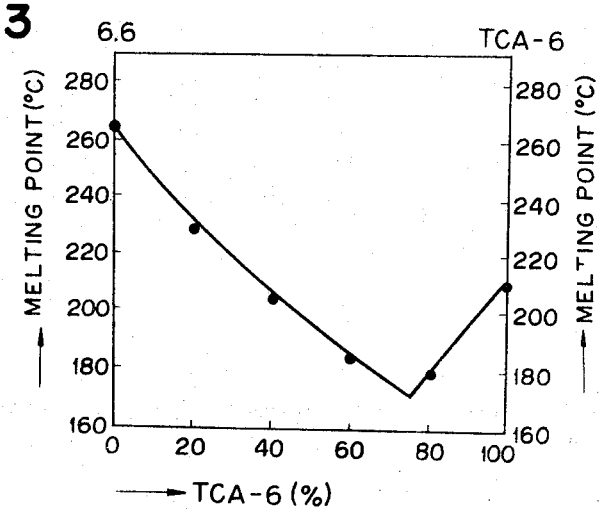
FIG. 3 is a chart showing the relation between the composition and melting point for random copolymers prepared from two kinds of nylon salt, one consisting of 1,2-bis (amino methyl) cyclobutane and adipic acid and the other consisting of hexamethylene diamine and adipic acid.

The relation of composition and melting point of the resulting random copolymer is shown in FIG. 3.

The random copolymer which contains 80 percent of TCA–6 component was non-crystalline type polymer.

EXAMPLE 2

Two kinds of prepolymer were made, one (M.W. 1,750), having carboxylic-terminated group, which is produced by adding 6 mol percent of adipic acid to ε-caprolactam, designated "6 acid" and the other (M.W. 1,780) having amino-terminated group, which is produced by adding 6 mol percent of hexamethylene diamine to ε-caprolactam, designated "6-amino." In addition, TCA–6 prepolymer having amino-terminated group and TCA–6 prepolymer having carboxylic-terminated group were also prepared as described in example 1. Using these four kinds of prepolymer, various block copolymers, having different component ratios, were synthesized by the same procedure as described in example 1. The composition ratios of the resultant block copolymers are shown in table 2, together with their respective melting points and intrinsic viscosities.

In the other hand, the melting points and reduced viscosities of the random copolymers which were prepared using the same composition ratio as mentioned above from ε-caprolactam and TCA–6 nylon salt under the same reaction conditions described in the comparative Example 1 are also shown in table 2.

TABLE 2

Block Polyamides and Composition Variance

| Terminated Group | M.W. | TCA–6 contents (%) | | | | | |
|---|---|---|---|---|---|---|---|
| | | 0 | 20 | 40 | 60 | 80 | 100 |
| TCA–6 amino | 1500 | 0 | 3 | 6 | 9 | 12 | 15 |
| TCA–6 acid | 1910 | 0 | 3.8 | 7.6 | 11.5 | 15.3 | 19.1 |
| 6 amino | 1780 | 17.8 | 14.2 | 10.7 | 7.1 | 3.6 | 0 |
| 6 acid | 1750 | 17.5 | 14 | 10.5 | 7 | 3.5 | 0 |
| Block copolymer m.p. (°C) | | 214 | 214 | 213 | 212 | 211 | 211 |
| Block copolymer intrinsic viscosity | | 1.4 | 1.1 | 1.4 | 1.2 | 1.5 | 1.3 |
| Random copolymer m.p. (°C) | | 214 | 185 | 157 | 164 | 188 | 211 |
| Random copolymer reduced viscosity* | | 1.4 | 1.3 | 1.5 | 1.8 | 0.9 | 1.3 |

*measured at 25°C using 0.5% metacresol solution.

From these results, it is understood that the first group of products are block copolymers.

EXAMPLE 3

Two kinds of prepolymer were made, one (M.W. 1,550), having amino-terminated group, which is produced by adding 13.6 parts of paraxylylene diamine to 160 parts of 11-amino-undecanoic acid, and the other (M.W. 1,600), having carboxylic-terminated group, which is produced by adding 21.8 parts of $\delta,\delta'$-oxy-divaleric acid to 160 parts of 11-aminoundecanoic acid. Next, two kinds of prepolymer were prepared, one (hereinafter called X–05), having a molecular weight of 2,000 and amino-terminated group, which is produced by adding 13.6 parts of paraxylylene diamine to 212 parts of nylon salt consisting of paraxylylene diamine and $\delta,\delta'$-oxy-divaleric acid, and the other (hereinafter called X–05), having a molecular weight of 2,080 and carboxylic terminated group, which is produced by adding 21.8 parts of $\delta,\delta'$-oxy-divaleric acid to 212 parts of nylon salt consisting of paraxylene diamine and $\delta,\delta'$-oxy-divaleric acid.

These four kinds of prepolymer were mixed in the powder state in the ratios indicated below in table 3, and melted at 250°C. for 10 minutes under a current of nitrogen, and reacted at 240°C. for 1.5 hours under reduced pressure of 1 mmHg, and finally obtaining block polyamides, having the melting points and reduced viscosities shown in the following table 3. The block copolymers produced were crystalline with respect to all composition ratios.

TABLE 3

Block Polyamides and Composition Variance

| | M.W. | X–05 contents (%) | | | | |
|---|---|---|---|---|---|---|
| | | 100 | 80 | 56 | 30 | 0 |
| Amino terminated prepolymer of 11-amino-undecanoic acid | 1550 | 0 | 0 | 0 | 15.5 | 15.5 |
| Carboxylic terminated prepolymer of 11-amino-undecanoic acid | 1600 | 0 | 16.0 | 16.0 | 32.0 | 16.0 |
| Amino terminated prepolymer of X–05 | 2000 | 20.0 | 40.0 | 20.0 | 20.0 | 0 |
| Carboxylic terminated prepolymer of X–05 | 2080 | 20.8 | 20.8 | 0 | 0 | 0 |
| Block copolymer m.p. (°C) | | 243 | 232 | 215 | 205 | 185 |
| Block copolymer reduced viscosity* | | 1.5 | 1.4 | 1.8 | 1.3 | 1.6 |

*measured at 25°C. using 0.5% metacresol solution.

EXAMPLE 4

Prepolymers (hereinafter called PXD–12) of paraxylylene diamine and dodecanoic diacid were synthesized as follows:

First, PXD–12 prepolymer (M.W. 1,750), having amino-terminated group, was prepared by heating 188 parts of PXD–12 nylon salt and 13.6 parts of paraxylylene diamine at 290°C. under a current of nitrogen, reacting for 30 minutes under atmospheric pressure and finally reacting for 1 hour under reduced pressure of 1 mmHg.

Next, PXD–12 prepolymer (M.W. 1,900), having carboxylic terminated group, was prepared by treating 118 parts of PXD-nylon salt with 23 parts of dodecanoic diacid as same method as above.

These two kinds of PXD–12 prepolymers and two kinds of TCA–6 prepolymers prepared according to the method of example 1, were mixed in the desired ratios, and block copolymerized first at 280°C. for 10 minutes, next at 245°C. for 60 minutes.

Figure 4:
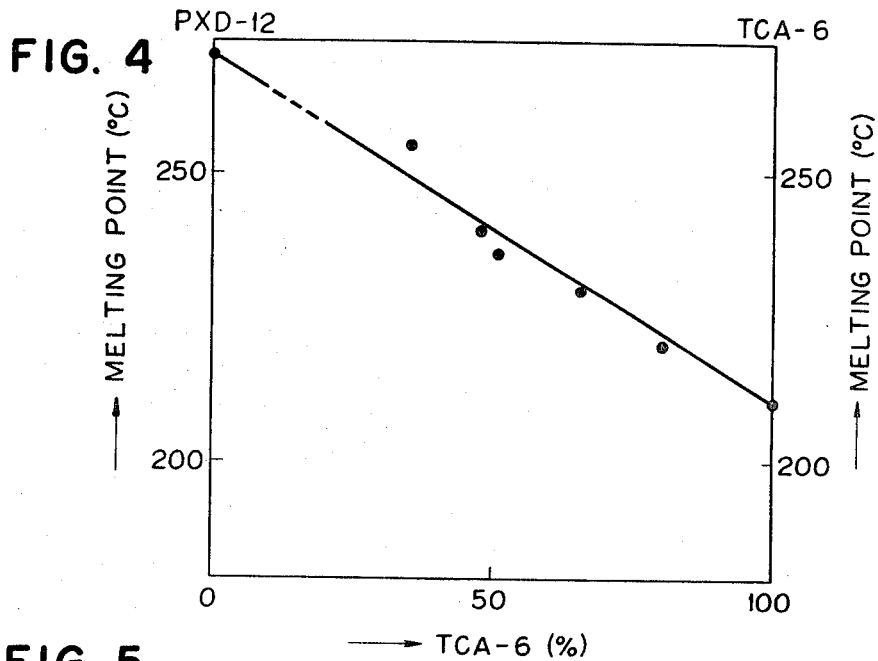
FIG. 4 is a chart showing the relation between the composition and melting point for block copolymers consisting of poly(paraxylene dodecamide) and poly(1,2-cyclobutane dimethylene adipamide)

Melting points of the block copolymer so obtained fall along the line connecting both the melting points of PXD–12 and TCA–6 as shown in FIG. 4. Reduced viscosity of the polymers, measured at 25°C. using 0.5 percent metacresol solution, is 1.0–1.6.

EXAMPLE 5

Prepolymers of hexamethylene diamine and dodecanoic diacid (hereinafter called 6,12) were synthesized from their nylon salts. 6,12-prepolymer (M.W. 3700), having amino-terminated group, was made from 379 parts of 6,12-nylon salt and 116 parts of hexamethylene diamine and 6,12-prepolymer (M.W. 3,900), having carboxylic terminated group, was made from 379 parts of 6,12-nylon salt and 36 parts of dodecanoic diacid.

These two kinds of 6,12-prepolymers and two kinds of X–05 prepolymers, prepared according to the method of example 3, were mixed in the desired ratios, and block copolymerized first at 250°C. for 20 minutes, next at 240°C. for 1.5 hours under reduced pressure of 2 mmHg.

Figure 5:
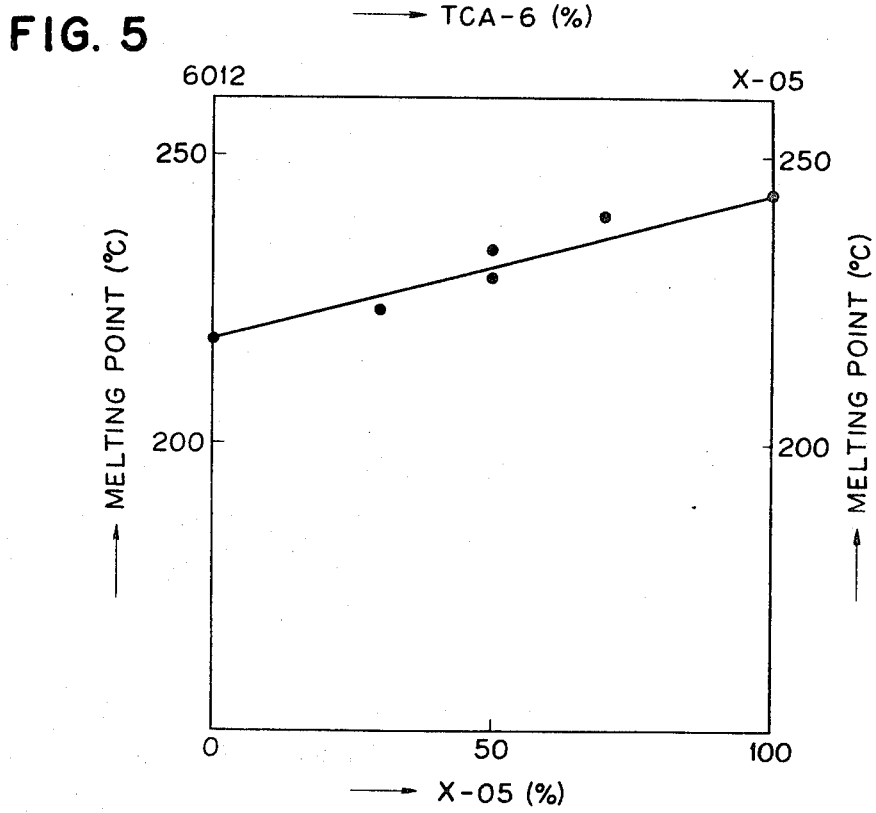
FIG. 5 is a chart showing the relation between the composition and melting point for block copolymers consisting of poly(hexamethylene dodecamide) (nylon 6,12) and poly (paraxylene-5-oxa-undecamide).

The melting points of block copolymer so obtained fall along the line connecting both the melting points of 6,12 and X–05 as shown in FIG. 5. Reduced viscosity of polymer, measured at 25°C. using 0.5 percent metacresol solution, is 1.0–1.8.

Generally, the difference in the properties of blend and block polymers consisting of polymer-I and polymer-II can be observed in the resolution behavior in a special solvent which is good solvent for polymer-I but nonsolvent for polymer-II. When blend and block polymers are treated in such solvent, the polymer-I component in the blend polymer will be dissolved while that in the block polymer will not be soluble.

EXAMPLE 6

Since polymer prepared from 1,2-bis-(amino methyl) cyclobutane and adipic acid (TCA–6) is soluble in 50 percent aqueous alcohol solution which is nonsolvent for polymer prepared from hexamethylene diamine and adipic acid (6,6), the components TCA–6 and 6,6 which were described in example 1 can be considered as polymer-I and polymer-II, respectively, According to these considerations, a blend polymer of TCA–6 and 6,6 was treated in this solvent (50 percent aqueous alcohol solution) and it was found that the TCA–6 component was soluble in said solvent substantially equal to the amount thereof initially incorporated in the composition. On the other hand, the TCA–6 component in the block polymer prepared by the procedure in this invention was only slightly soluble in the same solvent. These data are plotted as the curves in FIG. 6. From these results it is clear that both the TCA–6 and 6,6 components in the product prepared by the method in example 1 are, in the same polymer chain, combined with each other by chemical bondings.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. A method for producing block copolymers which comprises mixing at least two different prepolymers selected from the group consisting of prepolyamides represented by the formulas;

i. 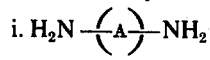  ii. 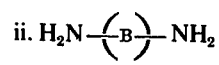

wherein at least one prepolymer is selected from (i) and (ii) and wherein at least one prepolymer is selected from (iii) and (iv) such that at least one prepolymer contains ($A$) units and at least one prepolymer contains ($B$) units wherein $A$ and $B$ are different polyamide units having a molecular weight of from 1,000 to 4,000 and selected from the group consisting of polycaproamide, polyheptamide, polynonamide, polyundecamide, poly(hexamethylene-adipamide), poly(hexamethylene sebacamide), poly(hexamethylene dodecamide), poly(hexamethylene-5-oxa-undecamide), poly(paraxylene-5-oxa-undecamide), poly(paraxylene decanamide) and poly(1,2-cyclobutane dimethylene adipamide), and the moles of amino- and carboxylic-terminated groups of said selected prepolymers being substantially equivalent, heating said mixed prepolymers up to the melting point of the prepolymer having higher melting point, and then copolymerizing said melted mixture of said prepolymers at a temperature not higher than 250°C under a reduced pressure.

2. A method according to claim 1, wherein $A$ and $B$ each represent poly(1,2-cyclobutane dimethylene adipamide) and poly(hexamethylene adipamide).

3. A method according to claim 1, wherein $A$ and $B$ each represent poly(1,2-cyclobutane dimethylene adipamide) and polycaproamide.

4. A method according to claim 1, wherein $A$ and $B$ each represent polyundecamide and poly(paraxylene-5-oxa-undecamide).

5. A method according to claim 1, wherein $A$ and $B$ each represent poly(paraxylene dodecamide) and poly(1,2-cyclobutane dimethylene adipamide).

6. A method according to claim 1, wherein $A$ and $B$ each represent poly(hexamethylene dodecamide) and poly(paraxylene-5-oxa-undecamide.

* * * * *